United States Patent [19]

Sarkans et al.

[11] 4,426,242

[45] Jan. 17, 1984

[54] METHOD FOR PRODUCING A MANIFOLD ASSEMBLY

[75] Inventors: Ivars Sarkans, Phoenix, Md.; Charles A. Figgins, Cincinnati, Ohio

[73] Assignee: American Standard, Inc., New York, N.Y.

[21] Appl. No.: 315,401

[22] Filed: Oct. 27, 1981

Related U.S. Application Data

[62] Division of Ser. No. 889,016, Mar. 22, 1978, Pat. No. 4,307,897.

[51] Int. Cl.[3] ........................ B32B 31/04; B32B 31/18

[52] U.S. Cl. .................................... 156/252; 156/253; 156/513; 156/516; 282/11.5 A

[58] Field of Search ............... 156/252, 253, 513, 514, 156/516; 281/12, 15 R; 282/11.5 A, 12 A, 12 R, 21 D, 21 C, DIG. 2, 7

[56] References Cited

U.S. PATENT DOCUMENTS

| | | | |
|---|---|---|---|
| 2,907,585 | 10/1959 | Sornberger et al. | 282/11.5 A |
| 2,935,002 | 5/1960 | Robinson, Jr. | 93/1.1 |
| 3,066,957 | 12/1962 | Huffman | 282/11.5 A |
| 3,149,859 | 9/1964 | Otis et al. | 282/11.5 A |
| 3,223,437 | 12/1965 | Bertsch | 282/11.5 A |
| 3,303,083 | 2/1967 | Hedenstrom | 156/513 |
| 3,495,852 | 2/1970 | Vath | 282/11.5 A |
| 3,503,629 | 3/1970 | Bash | 282/11.5 A |
| 3,558,159 | 1/1971 | Wakeman | 282/11.5 A |
| 3,655,222 | 4/1972 | Wakeman | 282/11.5 A |
| 3,655,491 | 4/1972 | Dyke | 156/253 |
| 3,756,889 | 9/1973 | Wolfberg et al. | 156/253 |
| 3,793,928 | 2/1974 | Wooten | 156/253 |
| 3,806,165 | 4/1974 | Skees | 282/11.5 A |
| 3,893,880 | 7/1975 | Cook | 156/253 |

FOREIGN PATENT DOCUMENTS

| | | |
|---|---|---|
| 807622 | 4/1951 | Fed. Rep. of Germany . |
| 2419852 | 4/1974 | Fed. Rep. of Germany . |

*Primary Examiner*—Caleb Weston

*Attorney, Agent, or Firm*—Robert C. Crooks; Daniel J. Reardon

[57] ABSTRACT

This invention relates to a flexibly and permanently interlocked manifold assembly of superimposed sheets or webs, and the method and apparatus for producing this assembly, wherein the superimposed sheets of the assembly are fastened by a stress-relieving means composed of crimps formed in one exterior sheet of said assembly and any intermediate sheets thereof; the crimps being formed in registry and the terminal margins thereof having an adhesive coated thereon and attached to the interior surface of the opposing exterior sheet of the said assembly.

9 Claims, 7 Drawing Figures

METHOD FOR PRODUCING A MANIFOLD ASSEMBLY

This application is a divisional application of application Ser. No. 889,016 filed Mar. 22, 1978 now U.S. Pat. No. 4,307,897.

BACKGROUND OF THE INVENTION

The provision of preprinted forms in an interconnected manifold set or layered assembly, composed of record forms, carbonless copying sheets, or record sheets with transfer sheets or carbons interleaved therebetween, is customary in modern business practice. It has been found most efficient to produce this type of assembly in a continuous form wherein the layered assembly is made severable along its length into a plurality of separate units by transverse perforations and also, by virtue of which, these units, corresponding to manifold sets of separate forms, are capable of being stacked conveniently in continuous zig-zag manner, for storage or transport.

Surface deformation in the several superimposed sheets of each assembly of the zig-zag stack will, unless some provision is made for flexible movement of the member sheets with respect to each other, tend to occur with consequent damage or distortion of the stacked or rolled assemblies. Deformation of the manifold assemblies of superimposed business forms, where the interconnection between the several sheets of the assembly is fixed or rigid, will also occur where the layered assemblies are forced about the feed rolls or cylindrical platens of varying diameters occurring in the many different business machines, including, for example, minicomputers, with which they are used increasingly. But whatever the particular deformation, either in storage, handling or use, the individual sheets or webs, tend, in this event, to shift longitudinally with relation to each other and must be free to do so. This interconnection or fastening of individual sheets in layered assembly occurs conventionally along the lateral margins of the superimposed sheets or webs using a variety of adhesive, crimping, and other techniques well-known to those skilled in the art.

Accordingly, if gluing, or other conventional, but less frequently employed means, such as stitching, stapling (which is capable of causing serious injury to a computer mechanism in which the manifold assembly is used), or the like, is employed to effect an immovable or inflexible fastening in which the superimposed sheets cannot shift longitudinally in relation to one another along the lateral margins of the superimposed sheets they cannot be folded or bent without buckling, distortion or even tearing of the forms. This much is well-recognized in the art and various means have been used or suggested to provide a more flexible fastening means capable of maintaining the condition of alignment of the assembled forms while accommodating the need for a longitudinal shift and a consequent, but reversible, misalignment to accompany deformation. At the same time, attempts have been made to reduce the bulkiness introduced into the assembly by gluing, stitching and other interlocking expedients incorporating foreign materials and rigidity into the assembly.

One means for maintaining the sheets or manifold assemblies in the necessary condition of alignment, while leaving the individual webs free to undergo shifting movement to avoid damage and internal stress, provides a series of crimps in the lateral margins of the assembly sheets. These crimps take the form of a series of marginal tabs or tongues, the free ends of which are depressed from the plane of the individual sheets to form interlocks based on this displacement. This expedient lacks permanence and stress tends to separate the several superimposed layers of an assembly so interconnected.

Another approach which is uniquely adaptable to manifolds, including record sheets and interleaved transfer or carbon copies, is that in which adjacent forms or record sheets bear continuous glue streams. The alternating transfer or carbon sheets, usually of relatively fragile integrity are bonded by means of the adhesive to both the underlying and overlying record sheets or strips using the foregoing glue streams. One or more series of marginal stress-relieving slits are provided in certain embodiments of this construction in the margin of the carbon sheets adjacent the paths of the record strip bonds to afford the desired adjustment to shifting. This construction thus retains the disadvantages, particularly of bulk and rigidity, of a more or less continuous glue stream and is, in any event, advantageously employed, it is believed, only where carbons are alternately interleaved in the manifold assembly. Additional disadvantages inherent in this latter expedient are the requirement of special and onerous additional production steps and equipment to make the stress-relieving slits in the carbon sheets, which results in additional expense in production of the forms and which, at the same time, weakens the carbon construction and renders it vulnerable to stress and damage by tearing and the like.

A further expedient proposed heretofore employs a combination of tab-formation and adhesive wherein a tongue is struck up from one exterior sheet vertically through holes provided in registry in the one or more intermediate sheets to pass outwardly onto the outer surface of the opposite exterior sheet to which the tab is made to adhere by gluing of the underside of the tab to the surface of the sheet. The tab may be further extended to double-back through a second series of orifices, as well. A further embodiment of similar aspect, described heretofore, suggests that the tabs lanced from one exterior sheet of an assembly be glued along their free underlying surfaces, after passing through a series of holes in registry in the intermediate sheets, to the interior surface of the opposing exterior sheet. The opposing exterior sheet is otherwise unmodified for this purpose. Alternatively, tabs may be formed on the opposing exterior sheets and made to pass through the holes of the intermediate sheets to adhere to the opposite surface of a centrally disposed sheet in the assembly. This latter sheet is unmodified for the purpose of forming an interlock, except for the adhesive disposed on its opposite surfaces between the fastening tabs.

The latter expedients require several additional steps and apparatus in preparation; for example, one or more punch units for the tab or tabs of each fastening point, a punch unit for the holes of the intermediate sheets or web and one or more special pressure units to push the tab or tabs through the holes in combination with a glue device. Further, the foregoing tab connectors are not adapted to permit the release of single sheets in series from the assemblies.

In the event, therefore, that means could be devised which would provide for high speed production of manifold assemblies, the superimposed sheets of which were fastened to one another by a combination of crimping and adhesive and in which the adhesive is used in minimal amounts consistent with the optional separation or decollation from the assembly of individual sheets and in which each crimp fastening required only a single crimp module, in combination with a single glue device while permitting the requisite alignment, and longitudinal shifting during assembly deformation, a significant advance in the state of the art would be attained.

It is, accordingly, an object of this invention to provide a plurality of continuous superimposed webs or sheets of flexible material, flexibly and permanently interconnected in manifold assemblies in a condition of alignment which permits the individual sheets to engage in, at least, a longitudinal shifting movement with respect to one another when the planar configuration of the assembly is disturbed to avoid stress and damage to the assembly and a return to a position of alignment when the planar state is restored.

It is a further object of this invention to provide manifold assemblies from which individual sheets or forms can be severed in series or decollated without materially affecting the fastening of the remaining sheets or forms therein.

It is still a further object of this invention to provide a high speed method and correspondingly efficient conventional apparatus with minimal but significant modification for producing the interlocked manifold assembly of the invention.

SUMMARY OF THE INVENTION

This invention provides accordingly, a manifold assembly composed of a plurality of overlapping or superimposed flexible sheets normally made of paper, including carbon interleaved and carbonless forms in a continuous assembly, including a pair of outer or exterior means for fastening said sheets in planar alignment while permitting a reversible stress-relieving longitudinal shifting of said sheets with respect to each other in response to distortion of the planar disposition of the assembly. The foregoing fastening means comprises a plurality of crimps or crimp legs in registry and struck or lanced from one of said exterior sheets, and said one or more interior sheets, where present; the free terminal margins of said crimps having adhesive coated thereon and joined to the interior surface of the other of said exterior sheets. The invention encompasses, as well, the method and apparatus for production of these manifold assemblies wherein the foregoing tabs are struck by a forming die or blade commonly known as a crimping module mounted in the collating apparatus in which the continuous manifold sheets are formed so that the free distal or terminal margins of each of said crimps or crimp legs extend below the plane of the assembled sheets in which the crimps or crimp legs are provided; the crimps being depressed from the plane of the assembly by an angle less than normal to said plane and so disposed as to present their free terminal or distal margins longitudinally, that is in the machine direction of said assembly through said collating apparatus to permit application of glue or other adhesive, from an adhesive applicator, to said free extreme distal margins or edges of each of said crimps to effect their merger, and bring the remaining exterior sheet or web into contact with the surface provided by said merged terminal margins of said crimps while the adhesive applied thereto is still tacky and capable of adhering to the surface of said remaining exterior sheet.

BRIEF DESCRIPTION OF THE DRAWINGS

The foregoing and additional objects, features and advantages of this invention will be apparent to those skilled in the art from the following detailed description of the preferred embodiments of the invention when taken in conjunction with the accompanying drawings in which.

DESCRIPTION OF THE PREFERRED EMBODIMENT

Figure 1:
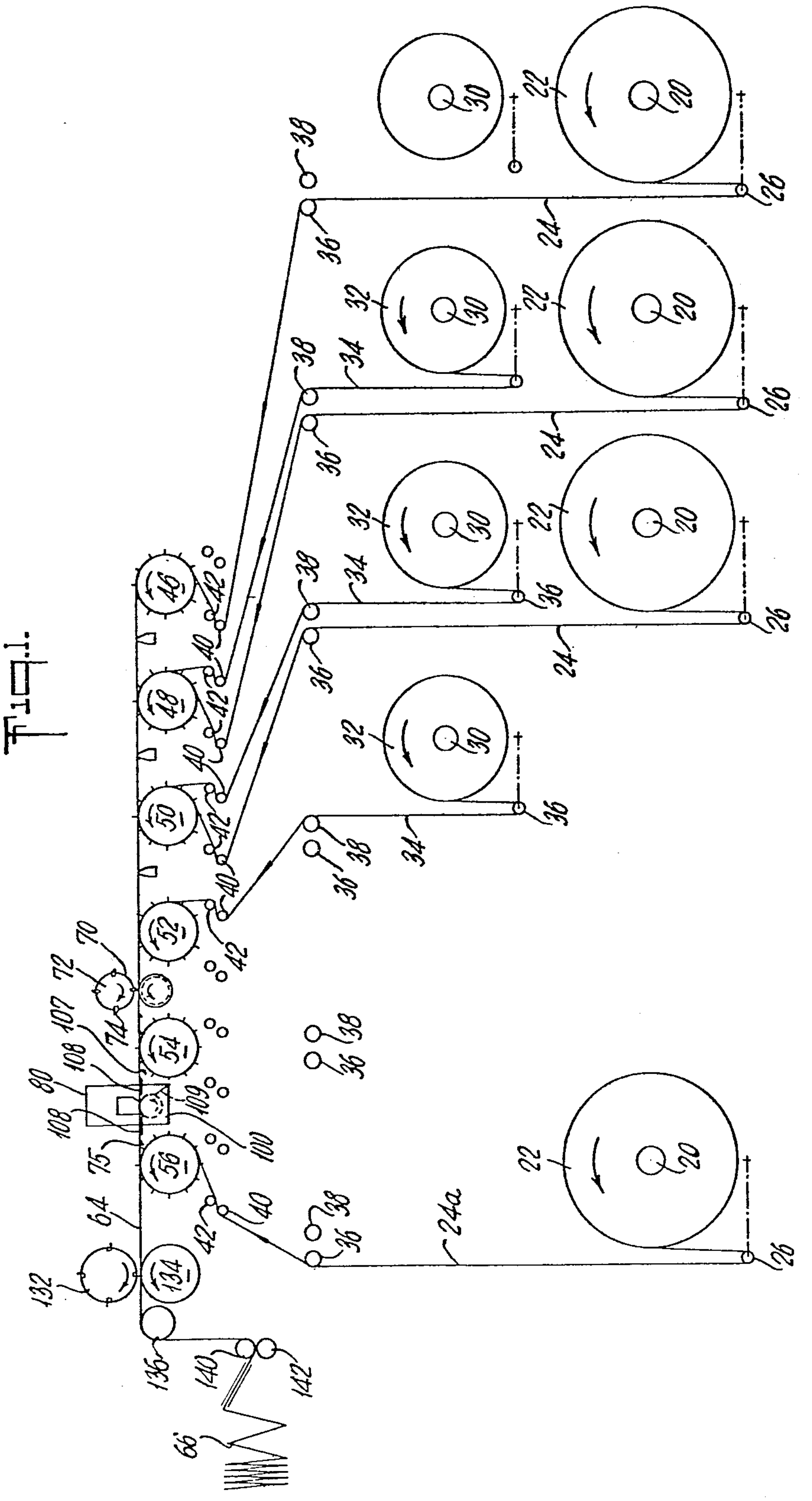
FIG. 1 is a schematic side elevational view of apparatus for carrying out the process of the present invention.

The process of the present invention will be described in detail with particular reference to an apparatus such as shown in FIG. 1 for carrying out the process, and incorporating the mechanism, according to the invention. In general, then, a collating machine incorporating these inventive features is provided with a plurality of horizontally disposed cantilevered spindles or arbors 20 rotatably mounted on a frame (not shown). These arbors 20 are adapted to receive a number of rolls 22 of continuous flexible sheet or web substrate or material 24, and in a preferred embodiment, preprinted webs or record sheets, for example, preprinted paper business forms bearing stub punched aligner and pinfeed holes 25 spaced at regular intervals along at least one of their margins and adjacemt and interior thereof, longitudinally disposed stub perforations 27 (see FIGS. 5 and 6). These sheets or webs are fed, in a synchronized manner, according to standard procedures, about the dancers or rolls 26 which are adapted to control braking of the feed mechanism and spacing of the continuous web or continuous sheet 24 transmitted from the rolls 20.

Mounted, optionally in the practice herein described, on a second set of cantilevered rotatably mounted and horizontally disposed arbors 30 are rolls 32 of transfer sheets or carbon paper, the webs or sheets 34 of which are unrolled and fed about the idler or dancer rolls 36 which serve as braking and spacing means in the same manner as described with respect to the record sheet dancer rolls 26.

In the embodiment of FIG. 1, the webs or sheets are fed from the rolls 22 and 32 in a counterclockwise manner. It will be evident that the method of release, whether clockwise or counterclockwise, is one of choice and not critical to the invention described herein. The rolls 26, 30 and 36 are all mounted on the frame (not shown) upon which the spindles 20 are disposed and in a similar manner. The record sheets 24, and, where present, the transfer sheets 34 pass upwardly about the idler rolls 36 and 38 respectively, used to assure appropriate spacing of the webs with respect to one another, and thence through the respective cantilevered pairs of tensioning bars 40 and 42.

It will be obvious to those skilled in the art that the assembly of the record, and transfer sheets or webs where present, can take place from above, using for example, a standard Hamilton collator configuration (manufactured by Hamilton Tool Company, Hamilton, Ohio) without departing from the scope or spirit of the present invention.

From the tensioning bars which act as paper guides, the record webs 24 and transfer webs 34 pass about the synchronized, power-driven pinfeed cylinders 46, 48, 50, 52, 54 and 56. In alternative embodiments, readily apparent to those skilled in the art, the foregoing webs drop upon the cyllinders or a pinfeed band where assembled from above; or pass about a band such as the foregoing used in place of the foregoing pinfeed cylinders. The cylinders, as shown, contain a series of evenly spaced normally retractable pins 58, or alternatively pin bands (not shown) about one end to engage the marginal equally spaced aligner and pinfeed holes 25, referred to hereinabove, formed conventionally in the record and transfer webs prior to mounting upon the spindles 20 and 30 for assembly in registry in the assembly 62 on the pinfeed cylinders, thus assuring alignment of successive sheets, webs or plies and obviating slippage amoung the individual sheets of the assembly 62 and the cylinders. As shown in FIG. 1, transfer sheets are interposed only on the intermediate pinfeed cylinders 48, 50 and 52, so that they will alternate with record sheets in the assembly 62 with, however, record sheets occurring as the two exterior webs in the finally formed manifold 64 prior to transverse perforation thereof. It is within the contemplation of this invention, as noted elsewhere herein, that only two webs or plies may be placed in superimposed assembly, if desired.

The collating apparatus and method as thus far described are standard and well-known to those skilled in the art to which this invention pertains. Many conventional variations of this equipment, some of which are referred to elsewhere herein, may be employed without departing from the scope of the invention contemplated in connection therewith.

Figure 2:
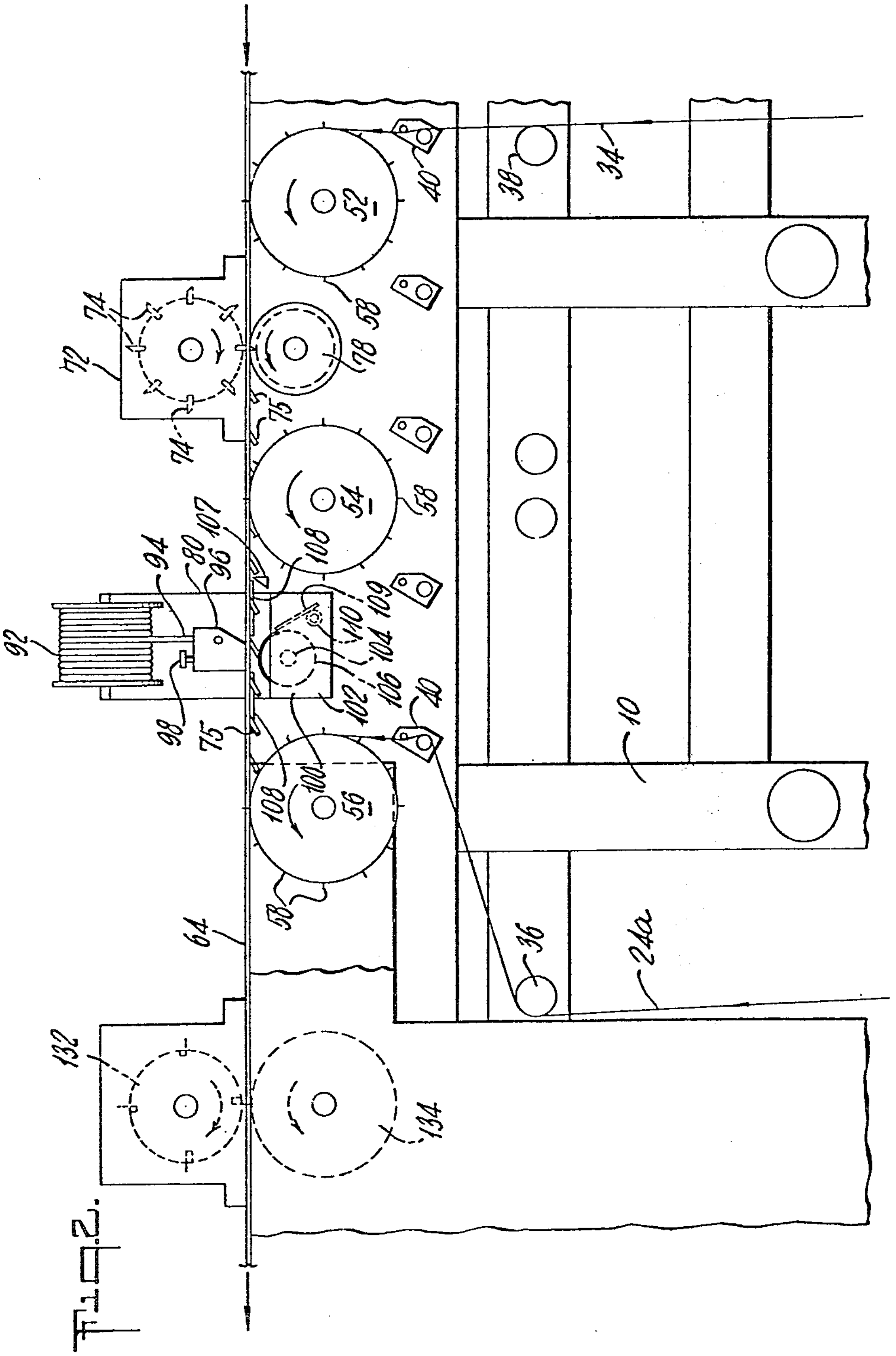
FIG. 2 is a fragmentary schematic side elevational view showing the crimping module and adhesive applicator of FIG. 1 in greater detail.
Figure 3:
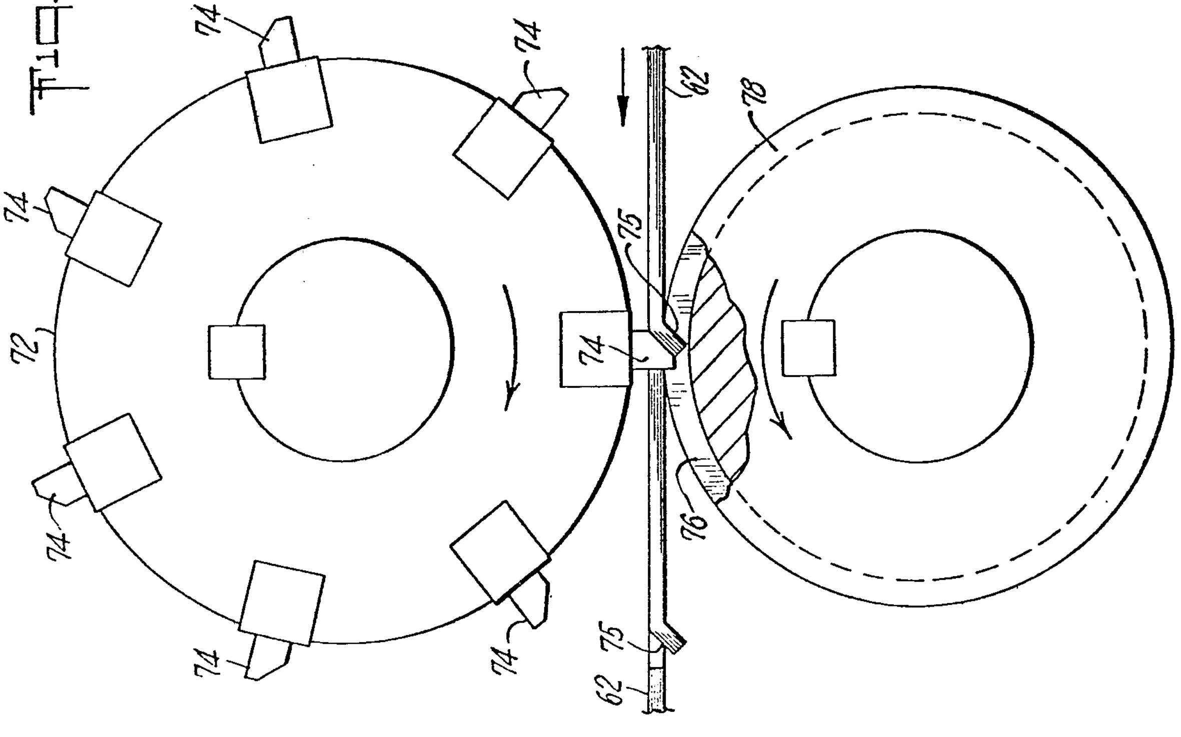
FIG. 3 is a side elevational view of the crimping module, or station, part being broken away to show the device and its operation in even greater detail.

Referring now to FIG. 1, in conjunction with FIGS. 2 and 3, of the drawing, there is shown mounted upon the frame of the collating apparatus, a rotatable crimping module or unit 70 composed of a male die element comprising a crimp holder ring 72 bearing crimping blades or punches 74 at regular intervals sufficient to impress or strike a plurality of crimps in each severable form 66 to be produced from the assembly 62 longitudinally in the web or machine direction, and normally within a range of once every one-half inch to once every four inches, and occurs preferably once each half-inch to once every two inches. While a series of these crimps may be disposed in a cross-machine pattern or longitudinally in the machine direction at any series of points across the web surface of the assembly, it is usual and generally most convenient to define the crimps or crimp legs in at least one or both of the lateral margins of the assembly sheets in the machine direction. The frequency of crimp or crimp leg formation will vary with the need for permanence and resistance to decollation of the manifold assembly.

Effectively, therefore, it is desirable to have from about four to eight crimps composed of a plurality of registered crimps or crimp legs 75 defined in at least one of the lateral or longitudinal margins of each of the business forms produced according to the invention. It has also been found particularly efficacious to have a plurality (preferably about three to six, and most desirably for most purposes, four) of these crimps (as shown illustratively in FIGS. 5 and 6 hereof) disposed in transverse parallel alignment in the aforesaid margins.

The crimp blades or punches are adapted to coact with the cylindrical recess 76 (shown by the broken line in FIG. 3) in the female die ring 78, and strike or punch a crimp leg 75 in each of the sheets of the assembly 62; the resulting plurality of crimps 75 being formed in registry with each other and integral with the sheet in which each is formed at one end and depressed from this point or origin through the apertures caused by their formation so that their free distal margins are directed into the path of travel of said assembly through the collating device at a point below the plane of the assembly 62 and at an angle or slant of less than 90°. No matter where the crimps or tabs are placed on the assembled sheets, they are, in accordance with the invention, disposed in a significantly preferred embodiment, in a forwardly directed slant or angle as thus described.

The crimping unit or module 70 is positioned upon the collating machine at a point between the pinfeed cylinders 52 and 54 so that all save one of the record sheets 24 are integrated into the assembly 62 when the assembly leaves the crimping module and passes to the adhesive applicator or glue device 80.

Figure 5:
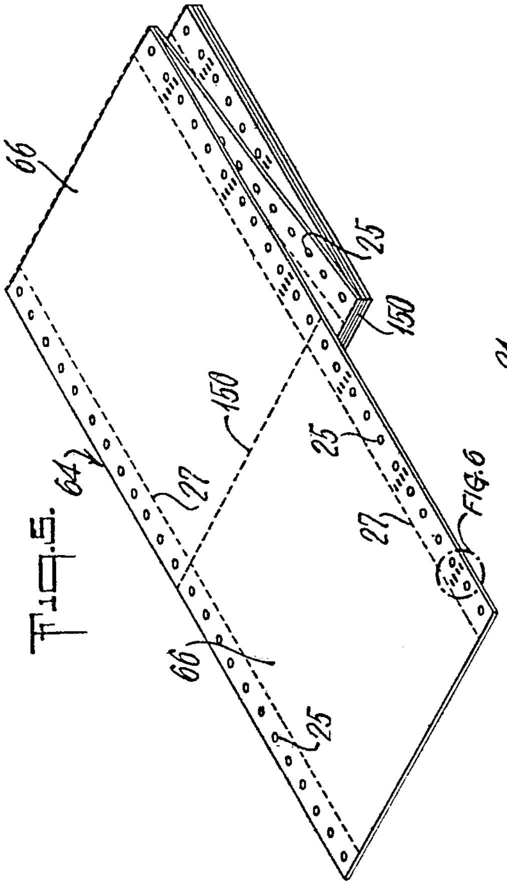
FIG. 5 is a perspective view of a manifold assembly of the present invention.

It will be apparent that to provide a plurality of parallel crimps or legs, as shown in FIG. 5, a plurality of blade elements or dies 74 must be mounted on the crimp holder ring 72 shown in side elevation, for example, in FIG. 3. Accordingly, a frontal view of the crimp module 70 would show, in context with the manifold assembly of FIGS. 5 and 6, four or more blade elements 74 evenly spaced in parallel alignment about the periphery of the crimp holder ring 72 and a corresponding number of cylindrical recesses or a continuous cylindrical recess 76 in the female die element 78.

The glue device 80, and its mode of operation are best described by reference to FIGS. 2 and 4, in conjunction with FIG. 1, of the drawing. Again, this element 80 may assume a variety of forms and modifications, but that shown in the drawing represents a preferred embodiment within the contemplation of the present invention. The unit is particularly adapted to use of hot-melt adhesives, although other adhesives including so-called cold glues or adhesives and pressure-sensitive glues and adhesives, are also employed in the practice of the invention and conventional means for applying these latter adhesives, well-known to those skilled in the art to which this invention pertains can be employed in the practice of the invention. Hot helt adhesives are generally and significantly preferred in the practice herein defined because of their brief setting times permitting operation of the process at high speeds.

In the embodiment shown, however, the glue applicator 80 is composed of a heated hot-melt glue supply unit 92 from which adhesive is supplied from the rope of solid adhesive 94, to the dispensing element 96 which is operated by the press release button 98 to renew the supply of adhesive 100 in the adhesive bath or reservoir 102 as it becomes depleted. Where the adhesive is a cold glue or pressure sensitive adhesive in the form of chips or liquid it is delivered to the dispenser conveniently through a tube or hose element.

Positioned in the glue bath or reservoir 102 and fixedly engaged about the axle 104 rotatably mounted to the lateral sides of the reservoir 102 is the glue wheel 106. Both the reservoir 102 and wheel 106 are heated to a temperature sufficient to melt and maintain the hot melt adhesive, where employed, in a molten or liquid state. Standard hot melt adhesives are maintained in the molten state at a temperature within the range of 300° F. to 450° F. It is convenient to make the side walls of the reservoir 102 transparent so that the adhesive level is known at all times without the use of special monitoring equipment and adhesive can be renewed before the adhesive level goes below the level of the glue wheel 106. The horizontally disposed axle 104 may be relocated vertically, that is, raised or lowered, as seen fit, and adjustable means (not shown) for such engagement are provided in the reservoir side walls. The glue wheel extends above the upper surface of the bath and, in operation, rotates in the machine direction. The thickness of the coat of glue present on the exposed upper surface of the wheel as it rotates is metered by the application blade 109 controlled by element 110. The height of the glue wheel is such that glue will be deposited on the surface formed by the plurality of distal margins or tips of the crimp legs without substantially extending this coverage to the adjacent surfaces thereof, and, at the same time, the wheel is so disposed that it will not itself contact the crimps and disrupt the registry of the several tabs or their angle or articulation with the assembly 62. This is essential so that the next step, in the procedure according to the invention, can proceed and the fastening process be successfully concluded.

Figure 4:
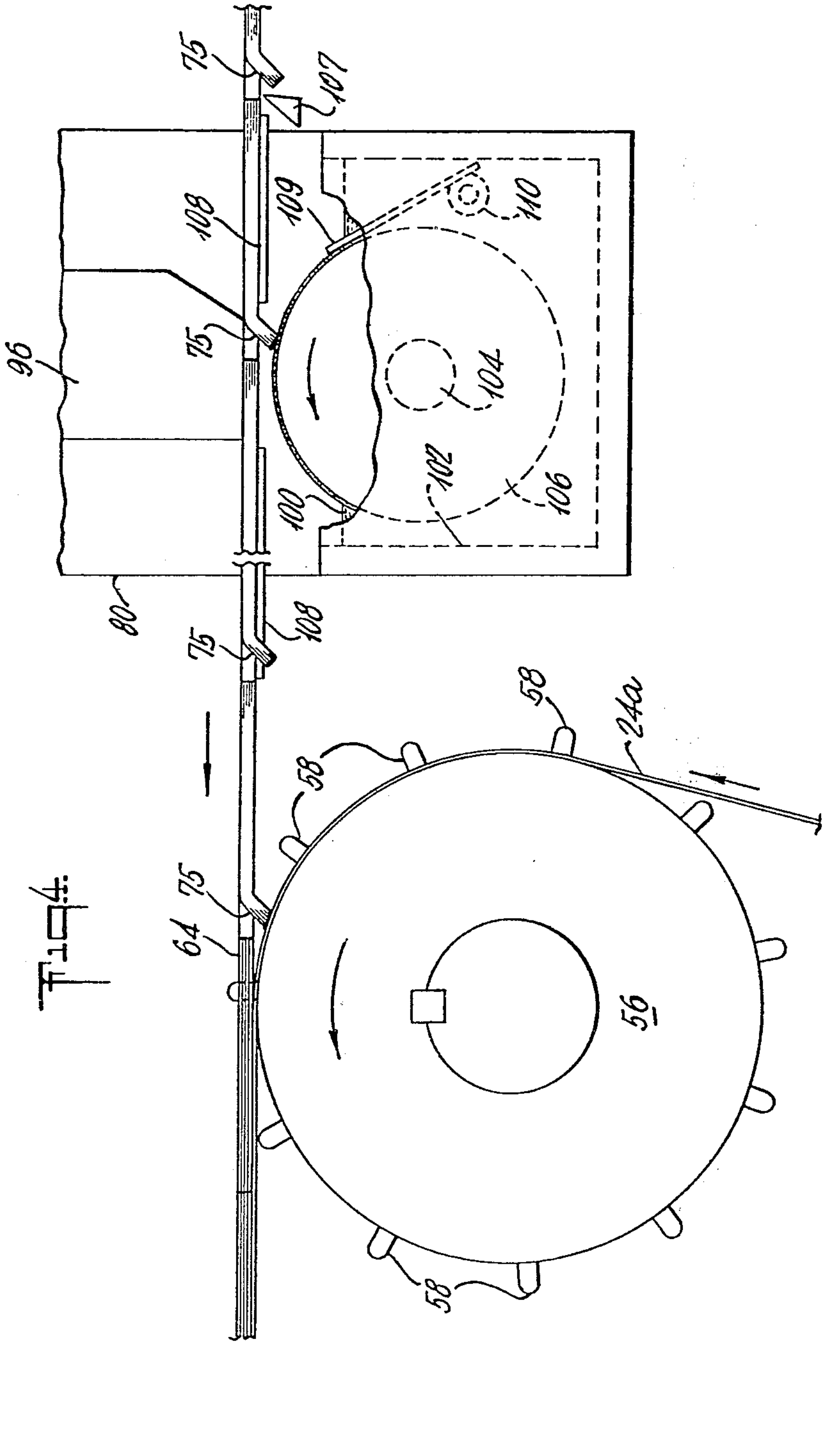
FIG. 4 is a fragmentary side elevational view of the adhesive applicator or glue device showing the manner in which the crimps are secured to an underlying exterior ply or sheet joined by the layered assembly.

As shown in FIGS. 1, 2 and 4, there is provided additionally, but optionally, between the crimping module 70 and the adhesive applicator 80, a finger or guide 107, which impinges upon each newly formed crimp causing it to be bent resiliently in a direction opposite to that of the flow of the web in the apparatus, for the purpose of assuring that the crimp will continue to sustain its downwardly disposed alignment and proper contact of the distal margins or tips thereof with the adhesive or glue wheel 106. Also provided desirable are a series of planar support guides 108 positioned before and after the adhesive applicator 80 to prevent undue bowing and flutter or dipping the assembly 62 over the adhesive wheel 106; thus reducing the possibility of contact between the assembly 62 and wheel 106. The supports or guides 108 are longitudinally disposed shafts of restricted width occurring laterally and internally of, or external to, the longitudinal path defined by the passage of the crimps 75 to and from the glue wheel 106. The crimping blades 70 are thus positioned at a distance from the lateral margin of the assembly 62 different from that of the guides 108.

After the glue is applied to the distal transverse margins of the crimps causing the crimp legs, in continuing registry, to adhere at their free ends to one another, the crimp legs so integrated, are moved with the assembly from which they are derived over the pinfeed guide cylinder 56 and into contact with the inner surface of the last underlying ply or sheet **24*a* which joins the assembly 62 at the pinfeed cylinder 56. The latter cylinder 56 is so positioned that it not only presses the exterior ply 24*a* into contact with the glue tips of the legs 75, but presses the crimp legs back toward and substantially into the assembly without, however, breaking the contact of the tabs with the inner surface of the exterior underlying ply 24*a***.

The finished and interlocked assembly 64 is then passed through the wholly conventional transverse web-perforating upper and lower blade-bearing cylinders 132 and 134 which effect a transverse or cross-web perforation of the assembly 64 to provide the continuous assembly of finished forms 66, the foregoing perforations coinciding with the upper and lower margins of the preprinted forms originally dispensed into collated assembly from the rolls 22 and 32.

The manifold assembly of forms 66 is then passed, in the embodiment of the drawing, about the pinfeed cylinder 136, or band (not shown) or other configuration, to the folding mechanism represented schematically by the rolls 140 and 142, where the forms 66 are arranged in zig-zag stacks for compact and efficient handling and storage.

Figure 7:
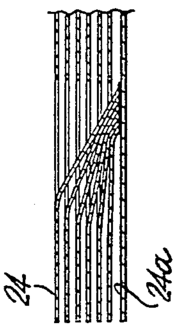
FIG. 7 is a fragmentary longitudinal sectional view of the manifold assembly shown in FIGS. 5 and 6 taken along the lines 7—7 of FIG. 5 and expanded to better illustrate the interlocking mechanism of the invention.
Figure 6:
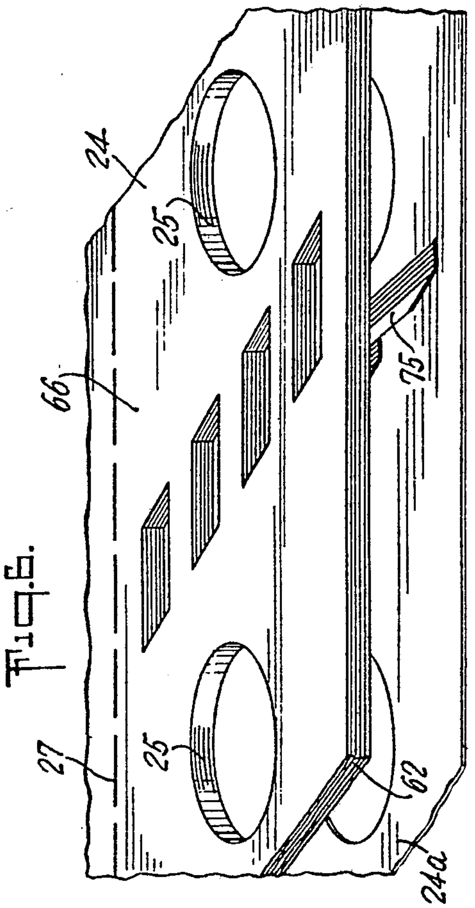
FIG. 6 is a fragmentary perspective view of the encircled portion of the manifold assembly shown in FIG. 5 expanded to show the interlocking mechanism of the invention.

As shown in FIGS. 5 to 7 a continuous manifold assembly 66, resulting from the practice described hereinabove, includes the crimp legs 75 bearing a cured adhesive on the transverse portions of their distal or terminal edges or tips at the point of contact thereof with the underlying exterior ply or sheet **24*a* and disposed, preferably, or at least conveniently, in the lateral margin of the continuous assembly and between the conventional stub punched aligner and pinfeed holes 25 used to align the forms 66 about the pinfeed cylinder of the collating machine and of the various business machines including calculators, mini-computers, printers, typewriters, teletype machines, or other printing apparatus utilizing continuous forms and the like with which the forms of the assembly are used. Also shown in FIG. 5 are the optionally included standard stub perforations 27, disposed longitidinally and interior to the foregoing pinfeed holes, and the transverse perforations 150 imposed on the assembly by the cylinders 132 and 134 and providing for severance of the continuous assembly 64 into unit manifolds 66 of, illustratively, preprinted business forms, as described elsewhere herein and, in the absence of such severance, for zig-zag folding of the continuous assembly. The mode of attachment of the crimp legs to the inner surface of the underlying exterior ply or sheet 24*a* (which, as is evident from the description afforded hereinabove and the drawing, is not crimped) is shown particularly in FIGS. 6 and 7. While the manifold assembly of the drawing shows seven record and transfer sheets superimposed on one another, it will be apparent that the apparatus and process of the invention is operative in the interlocking of as little as two or three sheets or webs and without narrowly critical limitation of the upper end of the range. The assemblies formed in accordance with conventional practice, however, will contain not less normally than two sheets or webs and not more than about twenty such sheets, and preferably about 3 to 8 thereof. The practice herein described is capable of utilization with or without interleaved transfer sheets or strips. If desired, record sheets may, therefore, be substituted on the arbors 30 for collation on the pinfeed cylinders of the collation apparatus. The length of the individual crimp legs is not narrowly critical so long as they are not so long as to droop or sag or so short that all or a portion of the free terminal margins of a particular crimp fails to protrude below the plane of the assembly 62**. A suitable crimp length normally is within the range of 0.05 inch to 0.1 inch, and preferably about 0.0625 inch.

In the event that transfer sheets are not interleaved in the manifold assembly, a conventional multiple sheet assembly can be substituted wherein each record sheet carries a coating comprising a pressure-transferable image-forming material on one of its surfaces; normally, the under surface of each succeeding sheet of the assembly. The inventional also contemplates the use of commonly and commercially available mated chemical carbonless paper wherein the contiguous surfaces of adjacent sheets contain a chemical coating which produces an image on impact.

It will be evident that the crimps 75 can assume a variety of configurations. The simplest, and normally the most advantageous, is a rectangular crimp or leg in which the free or distal margin is a straight edge. A free U-shaped leg or crimp leg end is, by way of illustration, also useful, however. In the former case, with the rectangular crimp of the drawing, a more permanent bond is secured. In the latter instance, employing a crimp leg in which the free edge is curvilinear, only a limited segment of the distal margin will receive adhesive, and, consequently, the degree of adhesion to the underlying sheet **24*a*** of the joined tabs will be minimal.

In accordance with the invention, the individual sheets or plies of each unit assembly 66 can be removed in series from the manifold without disturbing materially the interconnection of the remaining plies thereof so long as removal is commenced with the exterior ply 24 opposite to that **24*a* to which the crimp legs 75** are attached; and, for example, is the upper or lower ply.

It will be evident, too, that the terms and expressions which have been employed herein are used as terms of description and not of limitation. There is no intention in the use of such terms and expressions of excluding equivalents of the features shown and described or portions thereof, and it is recognized that various modifications are possible within the scope of the invention claimed.

What is claimed is:

1. A process for producing a manifold assembly in a collating apparatus that comprises collating a plurality of sheets in superimposed relationship within said apparatus; striking crimp legs in registry through said superimposed sheets and depressing the free ends of said crimp legs and the free terminal margins thereof in a substantially fully extended state below the plane of said superimposed sheets from which said crimp legs are struck when said sheets are in planar alignment, the free ends of said crimp legs including said free terminal margins facing in the direction of passage of said superimposed sheets through said apparatus and at an angle of less than about 90° from the plane of said superimposed sheets from which said legs are struck for the purpose of applying adhesive to said free terminal margins of said legs; and depositing adhesive on said free terminal margins of said crimp legs in their substantially fully extended state; collating said superimposed sheets with an exterior base sheet; and affecting adhesion of said free-terminal margins of said crimp legs to the interior surface of said exterior base sheet.

2. A process as claimed in claim 1, wherein said free terminal margin of said at least one crimp leg is substantially transverse with respect to the length of said leg.

3. A process as claimed in claim 1, wherein said plurality of sheets passing through said apparatus include at least one interior sheet.

4. A process as claimed in claim 1 wherein said superimposed sheets and said exterior base sheet are flexible.

5. A process as claimed in claim 4 wherein transfer sheets are interleaved alternately between superimposed sheets and said base sheet.

6. A process as claimed in claim 1, wherein the crimp legs are struck in at least one of the lateral margins of said assembly.

7. A process as claimed in claim 1, wherein said crimp legs are struck in substantially equal length and conformation.

8. A process as claimed in claim 1, wherein said adhesive is a hot melt adhesive.

9. A process as claimed in claim 1, wherein said adhesion is affected while said adhesive is tacky.

* * * * *

UNITED STATES PATENT AND TRADEMARK OFFICE

CERTIFICATE OF CORRECTION

PATENT NO. : 4,426,242

DATED : January 17, 1984

INVENTOR(S) : IVARS SARKANS AND CHARLES A. FIGGINS

It is certified that error appears in the above-identified patent and that said Letters Patent is hereby corrected as shown below:

Col. 1, line 10, after "forms" insert a comma (,).

Col. 3, line 61, after "is" insert a comma (,).

Col. 4, line 22, cancel "by" and insert --to--.

Col. 4, line 50, cancel "adjacemt" and substitute --adjacent--.

Col. 6, line 61, cancel "helt" and substitute --melt--.

Col. 7, line 35, cancel "or" after "angle" and substitute --of--.

Col. 7, line 48, cancel "desirable" and substitute --desirably--.

Col. 8, line 39, cancel "longitidinally" and substitute --longitudinally--.

Col. 9, line 11, cancel "inventional" and substitute --invention--.

Col. 9, line 35, cancel "too" and the commas (,) appearing before and after this term.

Signed and Sealed this

*Thirteenth* Day of *November 1984*

[SEAL]

*Attest:*

GERALD J. MOSSINGHOFF

*Attesting Officer* *Commissioner of Patents and Trademarks*